Feb. 22, 1955           P. POSER           2,702,465
APPARATUS FOR THE DYEING OF FUR SKINS
Original Filed Nov. 17, 1950           2 Sheets-Sheet 1
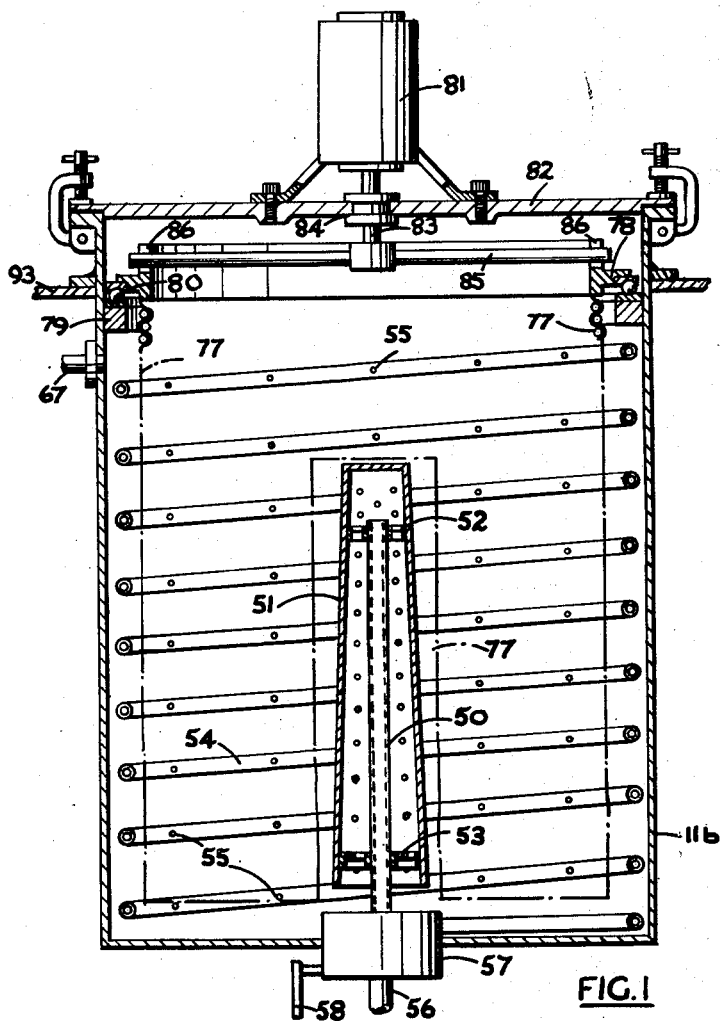
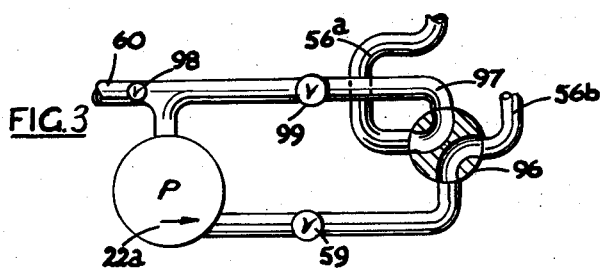
INVENTOR
PAUL POSER
By Mawhinney & Mawhinney
ATTYS.

Feb. 22, 1955             P. POSER             2,702,465

APPARATUS FOR THE DYEING OF FUR SKINS

Original Filed Nov. 17, 1950             2 Sheets-Sheet 2

INVENTOR

PAUL POSER

By Hawkinxey & Hawkinxey
ATTYS.

United States Patent Office 2,702,465
Patented Feb. 22, 1955

2,702,465
APPARATUS FOR THE DYEING OF FUR SKINS

Paul Poser, London, England

Original application November 17, 1950, Serial No. 196,223, now Patent No. 2,653,075, dated September 22, 1953. Divided and this application April 1, 1952, Serial No. 279,842

Claims priority, application Great Britain July 26, 1950

6 Claims. (Cl. 69—28)

The invention of this application, which is divided from my application Serial No. 196,223, filed November 17, 1950, granted under No. 2,653,075, relates to apparatus in which can be conducted a process, consisting of several steps by which, for example, fur skins can be washed, de-greased, re-washed, mordanted, dyed, re-washed and dried. Such a process is the subject of my said Patent No. 2,653,075, although the apparatus is adapted for the carrying out of other processes.

According to the invention the apparatus includes a container, for the articles to be treated, having a hermetically-sealing cover for an access opening thereof, and having at least one internal distributor for connection to a supply of fluid to be used, the container also having an outlet, for the fluid, which is sufficiently spaced from the distributor as to provide accommodation between them for the articles to be treated.

A further feature involves providing the container with at least two internal distributors, which are spaced apart to allow of the interposition of the articles to be treated, and providing means for putting the distributors alternately or simultaneously into communication with a supply of the fluid to be circulated between the articles. When the distributors are to be used alternatively, the one not being used for supplying the fluid can act as the outlet from the container to the return path of a circulatory system for the fluid, and when both distributors are used simultaneously to deliver the fluid to the container, the latter can have an overflow outlet to the said return path.

The apparatus of the invention is described with reference to the treatment of fur skins in the accompanying drawings, in which latter:

Figure 1 is a diagrammatic view, in vertical section, of one form of closable container according to the invention, being provided with two internal distributors;

Figure 3 is a modified detail of the plant shown in Figure 2.

Figure 2:
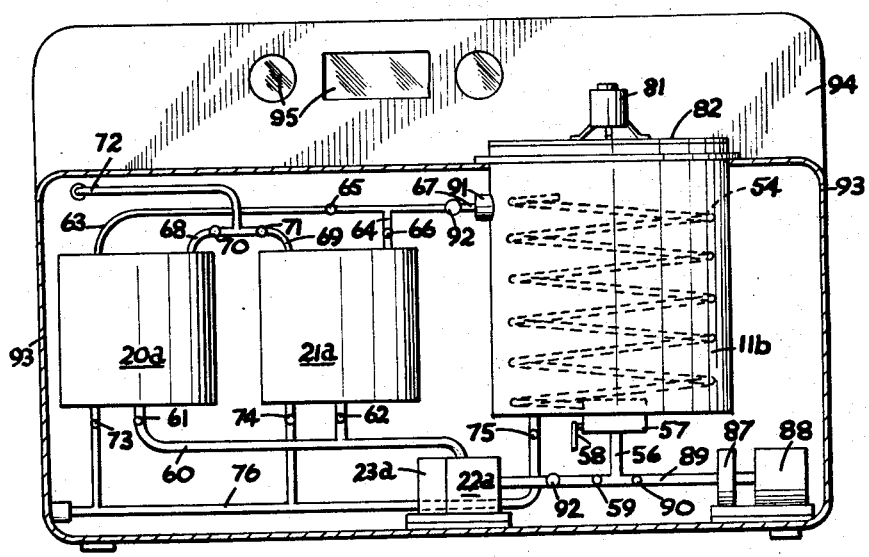
Figure 2 is a diagrammatic lay-out of a plant embodying the container of Figure 1 and including two reservoirs for alternative use.

Referring to Figure 1, the container 11b is an upright cylinder, and one of the distributors is a centrally-arranged pipe 50 (which may be perforated) of which an open upper end terminates short of the closed top of a perforated, upright, frusto-conical shield 51 which is supported from the pipe by spiders 52, 53. The other distributor is a helically coiled pipe 54 arranged to be near the inner periphery of the container and to extend from near the bottom to near the top of the latter, and this pipe has perforations (some of which are indicated at 55) which are directed radially-inwardly. These two distributors have a common supply pipe 56 at the bottom of the container, and there is a valve 57 of which the movable member can be adjusted, as by the handle 58, for putting either distributor or both of them into communication with the supply pipe. The perforations, from one end to the other of either or both distributors, can be of different sizes so as to secure equalisation of the pressure of the reagent delivery at all levels in the container, and the distributors can be fed from the pump through a pressure reducing means.

The supply pipe 56 communicates, through a cock 59, with the output side of a circulating pump 22a which is driven by an electric motor 23a, and the pump inlet communicates, through a pipe 60 and one of the cocks 61 or 62, with the outlet from either of two reagent reservoirs 20a, 21a. The tops of these reservoirs communicate, through pipes 63, 64 which are respectively controlled by cocks 65, 66, with an overflow outlet 67 near the top of the container. Also at the tops of the reservoirs 20a, 21a are branch pipes 68, 69, having cocks 70 and 71 respectively, through which a reagent, from any convenient source of supply (not shown), can be fed through a common feed pipe 72 to the appropriate reservoir. Cocks 73, 74 and 75 respectively control outlets from the reservoirs 20a, 21a and the container 11b to a drain pipe 76. By setting the cocks appropriately, either reservoir can be connected in a closed circuit with the container 11b and the pump for circulating a reagent whilst the other reservoir is being drained and refilled in preparation for the next step. Also, when the pump is a reversible one, the reagent can be pumped from the bottom of the container back into the bottom of the appropriate reservoir for re-use.

The container may be provided with an agitating basket 77 of a suitable material for the skins. As shown the top of the basket has a radial flange 78 by which it is rotatively supported from a ledge 79, with an interposed bearing 80. An electric motor 81, mounted on the outside of the hermetically-sealing cover 82, has its shaft 83 extending through a gland 84 in the cover and carries a laterally extending bar 85 to engage between diametrically-opposed pairs of abutments 86 on the flange 78 for driving the basket.

A fan 87, driven by an electric motor 88, can deliver drying air through a pipe 89, controlled by a cock 90, to the container when the supply of liquid reagent has been cut off from the container and the latter has been drained. By suitably setting the cocks the drying air can be conducted away from the container through the drain pipe 76 and thus safely carry off noxious vapour.

The various cocks can be operated, in a time cycle, by any suitable time control means whereby a complete process (i. e., successive steps for de-greasing, washing, mordanting, dyeing and re-washing the skins) can be carried out automatically.

The overflow outlet 67 preferably includes a filter 91, and thermometers 92, heaters (not shown), and any other desired instruments or devices (e. g., pressure gauges) can be arranged in suitable positions in the apparatus.

The whole apparatus can be enclosed in a cabinet 93 having a panel 94 displaying, for example, the dials 95 of the instruments employed and indicators for showing the particular step of a process being carried out and any other information it is necessary for the operator to have.

The modification shown in Figure 3 involves supplying the two injectors from separate supply pipes 56a, 56b, through a change-over valve 96, which latter connects with an additional return pipe 97 to the pump. In this case a cock 98 isolates the tanks 20a, 21a and the fluid enters the container by one distributor and leaves by the other in a continuous circulation.

Obviously instead of there being two reagent reservoirs there could be more (or even one) dependently upon the number of reagents to be used, and it will be seen that by appropriately setting the valves, the heaters, the time control device, etc., it is possible to treat the skins or other articles under strict control according to their typical requirements, and to do that without any necessity for handling them between successive steps of the complete process.

What I claim as my invention and desire to secure by Letters Patent of the United States is:

1. Apparatus, for use in conducting sequentially a plurality of fluid circulating steps of a process to be applied to a pliable absorbent article, comprising a container in which the articles are to be packed, a hermetically-sealing cover for an access opening of said container, at least two perforate retaining walls in said container for said articles, respective distributors within said container and outside said walls for a fluid to be supplied to said container, a reservoir for the fluid to be used, means connecting a distributor to said reservoir, and said container having adjacent another of said perforate walls an outlet for said fluid, said perforate walls sufficiently spaced to provide accommodation between them for the articles to be treated.

2. Apparatus, for use in conducting sequentially a plurality of fluid circulating steps of a process to be applied to a pliable absorbent article, comprising a container in which the articles are to be packed, a hermetically-sealing cover for an access opening of said container, at least two perforate retaining walls in said container for said articles, respective distributors within said container and outside said walls for a fluid to be supplied to said container, said walls being spaced to allow of the interposition of the articles to be treated, a reservoir for a fluid to be used, and means for connecting said distributors, either alternatively or together, to said reservoir, there being an outlet from said container for said fluid.

3. Apparaus, for use in conducting sequentially a plurality of fluid circulating steps of a process to be applied to pliable absorbent articles, comprising a cylindrical container in which the articles are to be packed, a hermetically-sealing cover for an access opening of said container, two concentric cylindrical perforate retaining walls in said container for said articles, a distributor within said container and outside one of said walls for a fluid to be supplied to said container, a reservoir for the fluid to be used, means connecting said distributor to said reservoir, and said container having adjacent the other perforate wall an outlet for said fluid, said perforate walls sufficiently spaced to provide between them an annulus for the accommodation of the articles to be treated.

4. Apparatus, for use in conducting sequentially a plurality of fluid circulating steps of a process to be applied to a pliable absorbent article, comprising a cylindrical container in which the articles are to be packed, a hermetically-sealing cover for an access opening of said container, two concentric cylindrical perforate retaining walls in said container for said articles, a distributor within said container and outside one of said walls for liquids to be supplied to said container, reservoirs for said liquids, a pump of which the outlet is connected to supply said distributor, means for selectively connecting said reservoirs to the inlet of said pump, said container having adjacent the other perforate wall an outlet for the fluid, said perforate walls sufficiently spaced to provide between them an annulus for the accommodation of the articles to be treated, and means for selectively connecting said container outlet to an inlet of the selected reservoir, whereby said container, said pump and said selected reservoir are connected in a closed circuit.

5. Apparatus, for use in conducting sequentially a plurality of fluid circulating steps of a process to be applied to pliable absorbent articles, comprising a cylindrical container in which the articles are to be packed, a hermetically-sealing cover for an access opening of said container, two concentric cylindrical perforate retaining walls in said container for said articles, respective distributors within said container and outside said walls for fluids to be supplied to said container, said walls being spaced to provide an annulus for the accommodation of the articles to be treated, reservoirs for fluids to be used, a pump, means for selectively connecting outlets of said reservoirs to an inlet of said pump, means for connecting said distributors, either alternatively or together, to an outlet of said pump, a fluid outlet from said container, means for selectively connecting said container outlet to inlets of said reservoirs, whereby said container, said pump and said selected reservoir can be connected in a closed circuit, means for connecting said container outlet to said pump inlet whilst said reservoirs are isolated from said pump and container, whereby said container and said pump can be connected in a closed circuit, and means for selectively connecting said pump outlet to inlets of said reservoirs whilst said container outlet is connected to said pump inlet and whilst said reservoir outlets are closed, whereby liquid in said container can be pumped back into the appropriate said reservoir for re-use.

6. Apparatus, according to claim 3, of which the container encloses a basket for the actual reception of the articles, a rotative support for the upper end of said basket from said container, a driving means supported exteriorly of said container from said hermetically-sealing cover, a shaft extending from said driving means through said cover in sealing manner, driven abutments fast with said basket, and a driving connection fast with said shaft and adapted to engage said abutments when said cover is in closed position.

References Cited in the file of this patent

UNITED STATES PATENTS

| | | |
|---|---|---|
| 575,404 | McMurtry | Jan. 19, 1897 |
| 659,077 | Lester | Oct. 2, 1900 |
| 2,426,372 | Poser | Aug. 26, 1947 |